United States Patent
Khazeni

(10) Patent No.: US 7,860,668 B2
(45) Date of Patent: Dec. 28, 2010

(54) PRESSURE MEASUREMENT USING A MEMS DEVICE

(75) Inventor: Kasra Khazeni, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 318 days.

(21) Appl. No.: 12/141,326

(22) Filed: Jun. 18, 2008

(65) Prior Publication Data

US 2009/0319220 A1    Dec. 24, 2009

(51) Int. Cl.
*G01F 1/00*    (2006.01)
(52) U.S. Cl. ........................................ 702/47
(58) Field of Classification Search ............. 702/47; 417/413.2; 307/52
See application file for complete search history.

(56) References Cited

U.S. PATENT DOCUMENTS

| | | | |
|---|---|---|---|
| 2,696,566 A * | 12/1954 | Lion et al. ............ 307/52 |
| 4,441,791 A | 4/1984 | Hornbeck | |
| 4,571,603 A | 2/1986 | Hornbeck et al. | |
| 4,748,366 A | 5/1988 | Taylor | |
| 4,859,060 A | 8/1989 | Katagiri et al. | |
| 4,954,789 A | 9/1990 | Sampsell | |
| 5,083,857 A | 1/1992 | Hornbeck | |
| 5,216,537 A | 6/1993 | Hornbeck | |
| 5,226,099 A | 7/1993 | Mignardi et al. | |
| 5,489,952 A | 2/1996 | Gove et al. | |
| 5,526,172 A | 6/1996 | Kanack | |
| 5,530,240 A | 6/1996 | Larson et al. | |
| 5,550,373 A | 8/1996 | Cole et al. | |
| 5,551,293 A | 9/1996 | Boysel et al. | |
| 5,629,521 A | 5/1997 | Lee et al. | |
| 5,815,141 A | 9/1998 | Phares | |
| 5,894,686 A | 4/1999 | Parker et al. | |
| 5,977,945 A | 11/1999 | Ohshima | |
| 6,040,937 A | 3/2000 | Miles | |
| 6,164,933 A * | 12/2000 | Tani et al. ............ 417/413.2 |
| 6,295,048 B1 | 9/2001 | Ward et al. | |
| 6,304,297 B1 | 10/2001 | Swan | |
| 6,307,194 B1 | 10/2001 | Fitzgibbons et al. | |
| 6,666,561 B1 | 12/2003 | Blakley | |

(Continued)

FOREIGN PATENT DOCUMENTS

EP    0 649 010    4/1995

(Continued)

OTHER PUBLICATIONS

Mark W. Miles, "MEMS-based interferometric modulator for display applications," Proceedings of SPIE, vol. 3876, Aug. 1999, pp. 20-28.

(Continued)

*Primary Examiner*—Tung S Lau
*Assistant Examiner*—Xiuquin Sun
(74) *Attorney, Agent, or Firm*—Knobbe Martens Olson & Bear LLP

(57) ABSTRACT

A device to measure pressure is disclosed. In one embodiment, the device includes at least one element with two layers separated by a space which changes over a variable time period in response to a voltage applied across the two layers. The time period may be measured and indicative of the ambient pressure about the device.

22 Claims, 4 Drawing Sheets

U.S. PATENT DOCUMENTS

| | | |
|---|---|---|
| 6,674,562 B1 | 1/2004 | Miles et al. |
| 6,737,979 B1 | 5/2004 | Smith et al. |
| 6,819,469 B1 | 11/2004 | Koba |
| 6,829,132 B2 | 12/2004 | Martin et al. |
| 7,123,216 B1 | 10/2006 | Miles |
| 7,138,984 B1 | 11/2006 | Miles |
| 7,280,265 B2 | 10/2007 | Miles |
| 7,327,510 B2 | 2/2008 | Cummings et al. |
| 7,369,294 B2 | 5/2008 | Gally et al. |
| 2002/0075555 A1 | 6/2002 | Miles |
| 2003/0112507 A1 | 6/2003 | Divelbiss et al. |
| 2003/0117382 A1 | 6/2003 | Pawlowski et al. |
| 2003/0128197 A1 | 7/2003 | Turner et al. |
| 2004/0024580 A1 | 2/2004 | Salmonsen et al. |
| 2005/0001797 A1 | 1/2005 | Miller et al. |
| 2005/0068254 A1 | 3/2005 | Booth |
| 2006/0066503 A1 | 3/2006 | Sampsell et al. |
| 2006/0066504 A1 | 3/2006 | Sampsell et al. |
| 2006/0066595 A1 | 3/2006 | Sampsell et al. |
| 2006/0066596 A1 | 3/2006 | Sampsell et al. |
| 2006/0066876 A1 | 3/2006 | Kothari |
| 2006/0067028 A1 | 3/2006 | Floyd |
| 2006/0077156 A1 | 4/2006 | Chui et al. |
| 2006/0077393 A1 | 4/2006 | Gally et al. |
| 2006/0077521 A1 | 4/2006 | Gally et al. |
| 2006/0077617 A1 | 4/2006 | Floyd |
| 2006/0176241 A1 | 8/2006 | Sampsell |
| 2007/0023851 A1 | 2/2007 | Hartzell et al. |
| 2007/0200839 A1 | 8/2007 | Sampsell |
| 2007/0242008 A1 | 10/2007 | Cummings |
| 2007/0247406 A1 | 10/2007 | Zhou et al. |
| 2008/0112031 A1 | 5/2008 | Gally et al. |
| 2009/0009847 A1 | 1/2009 | Sasagawa et al. |
| 2009/0141286 A1 | 6/2009 | Kothari |
| 2009/0207473 A1 | 8/2009 | Bita et al. |
| 2009/0244543 A1 | 10/2009 | Webster |
| 2009/0244679 A1 | 10/2009 | Khazeni et al. |
| 2009/0244680 A1 | 10/2009 | Webster |
| 2009/0244681 A1 | 10/2009 | Webster |
| 2009/0244683 A1 | 10/2009 | Lan |
| 2009/0267869 A1 | 10/2009 | Gally et al. |
| 2009/0267953 A1 | 10/2009 | Sampsell et al. |
| 2009/0308452 A1 | 12/2009 | Sasagawa et al. |
| 2010/0117761 A1 | 5/2010 | Floyd |
| 2010/0123706 A1 | 5/2010 | Lan |
| 2010/0149722 A1 | 6/2010 | Floyd |

FOREIGN PATENT DOCUMENTS

| | | |
|---|---|---|
| EP | 0 725 380 | 8/1996 |
| JP | 2006 030098 | 2/2006 |
| JP | 2008-076106 | 4/2008 |
| WO | WO 02/097387 | 12/2002 |
| WO | WO 2004/066256 | 8/2004 |
| WO | WO 2005/066596 | 7/2005 |

OTHER PUBLICATIONS

Miles, "A New Reflective FPD Technology Using Interferometric Modulation," Journal of the SID 5/4, 1997, pp. 379-382.

Miles et al., 10.1: Digital Paper™ for reflective displays, SID 02 Digest, pp. 115-117, 2002.

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

ISR and WO dated Sep. 25, 2009 in PCT/US09/047552.

Brank et al., Sep. 2001, RF MEMS-based tunable filters, International Journal of RF and Microwave Computer-Aided Engineering, 11(5):276-284.

* cited by examiner

PRESSURE MEASUREMENT USING A MEMS DEVICE

BACKGROUND

Field of the Invention

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs, transmits, and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

The device of the current invention is intended to measure the pressure about the device, and although it has a similar structure as an interferometric modulator, it may or may not have the optical properties of a typical interference modulator.

SUMMARY

One aspect of the invention is a device for measuring pressure comprising at least one element comprising two layers separated by a space, wherein a dimension of the space changes over a variable time period in response to a voltage applied across the two layers and a measuring module configured to measure the time period, wherein the time period is indicative of the ambient pressure about the device.

Another aspect of the invention is a method of measuring ambient pressure comprising applying a voltage across two layers of a MEMS device, measuring a value characteristic of the response time of the device, and determining a pressure about the device based on the measured value.

Yet another aspect of the invention is a device for measuring pressure comprising at least one element comprising two conductive layers separated by a space, wherein a dimension of the space changes over a variable time period in response to a change in voltage applied across the two layers, a measuring module configured to measure current flowing between the two conductive layers as a function of time when there is a change in voltage applied between the two conductive plates, and a processor configured to determine the time difference between when the voltage pulse is applied and when the local maximum of the motion current occurs, wherein the processor is further configured to associate the time difference with an ambient pressure.

DETAILED DESCRIPTION OF CERTAIN EMBODIMENTS

Typical usage of an interferometric light modulator involves taking advantage of the optical properties of the device. In some embodiments, the interferometric light modulator is a bistable device having two states, each with different optical properties. The state a particular modulator is in is controllable by the application of an appropriate electrical signal. Thus, the interferometric light modulator is well-suited for display applications. However, other properties of a MEMS device having similar structure to an interferometric light modulator, can be used for other purposes, e.g. the measurement of the ambient pressure about the device.

Figure 1A:
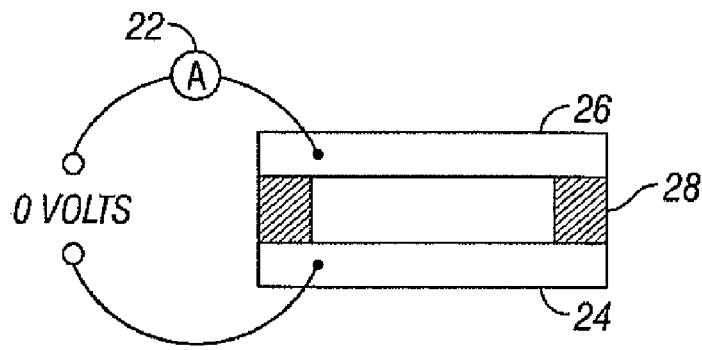
FIG. 1A shows an embodiment of the invention in the released state.
Figure 1B:
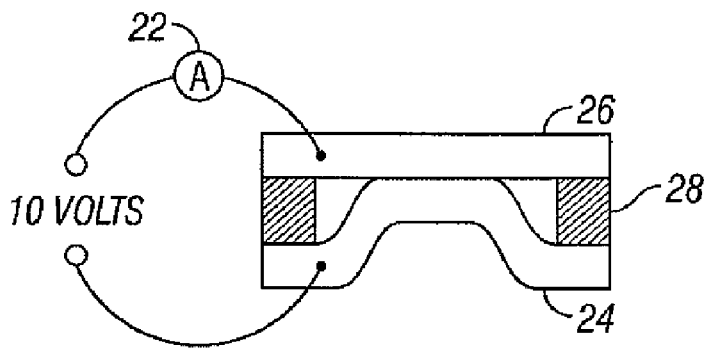
FIG. 1B shows an embodiment of the invention in the actuated state.
Figure 1C:
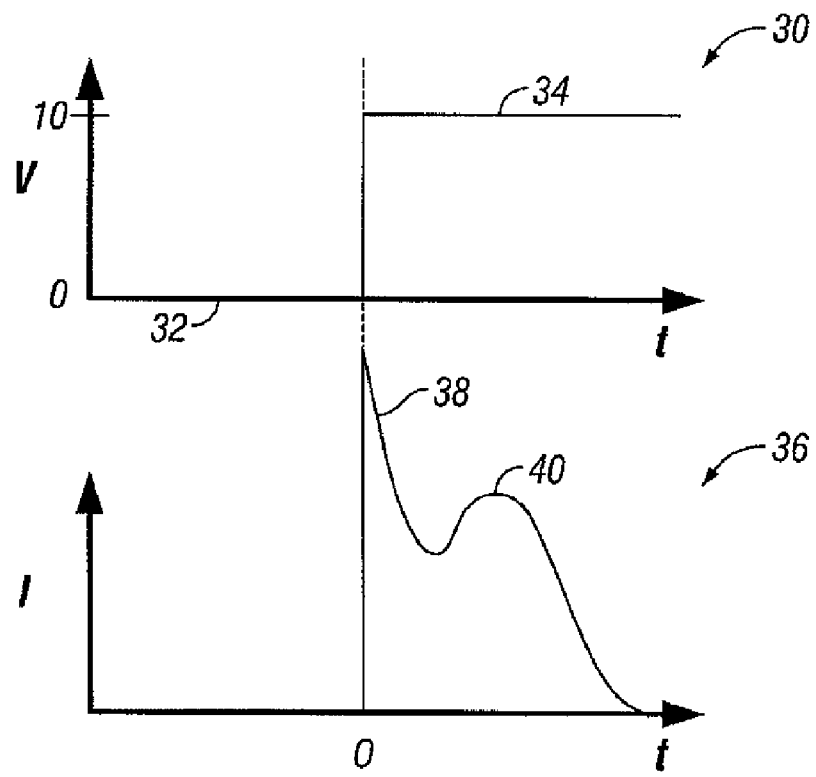
FIG. 1C shows an applied voltage and the current response of one embodiment of the invention due to the applied voltage.

FIG. 1A shows an embodiment of the invention in the relaxed state at a first time, and FIG. 1B shows the same MEMS device in the actuated state at a second time. FIG. 1C shows an applied voltage, capable of causing actuation, and the current response of one embodiment of the invention due to the applied voltage. The MEMS device shown in FIGS. 1A and 1B comprises a first layer 24 and a second layer 26. The two layers may be separated by supports 28. When a voltage is immediately applied across the two layers of the device, the device takes some time to change states, from the relaxed state shown in FIG. 1A to the actuated state shown in FIG. 1B. It is appreciated that the device may be designed without supports 28, or that both layers may move towards each other upon the application of a voltage.

The time it takes for such a MEMS device to actuate or release depends on the design of the device, the voltage signal, and the ambient pressure. In one embodiment, the actuation time of the modulator is a linear function of the ambient pressure. As such, the MEMS device can be used, with appropriate control and measurement circuitry, as a pressure sensor.

In one embodiment, an applied voltage 30 changing from a first value 32 to a second value 34 causes the first layer 24 to begin moving towards the second layer 26. The resulting current response 36 may exhibit multiple peaks, as measured by an ammeter 22 connected between the first layer 24 and the second layer 26. In general, the current response 36 can be described by the following equation:

$$I = \frac{dQ}{dt} = C\frac{dV}{dt} + V\frac{dC}{dt}.$$

The first peak 38 is caused by the change in the applied voltage 30 from a first value 32 to a second value 34, as described by the first term in the above equation. The second peak 40 is caused by the change in capacitance associated with the movement of the first layer 24 relative to the second layer 26, as described by the second term in the above equation. The motion of the first layer 24 relative to the second 26, and thus, the second peak 40 in the current response 36 is affected by the ambient pressure.

As the first layer 24 picks up speed as it moves towards the second layer 26 there is an increase in the measured current corresponding to the left half of the second peak 40. At a point of maximum velocity, the first layer 24 begins to slow down as it pushes air out from between it and the second layer 26. This point is indicated by a maximum in the second peak 40 of the current response 36. Finally, the first layer 24 comes to rest, with the device in an actuated state. The actuation time of the device can thus be measured in a number of ways. For instance, the actuation time can be considered the amount of time required for the first layer 24 to reach maximum velocity. The actuation time can also be considered the amount of time required for the first layer to move fully from a relaxed state to an actuated state. The actuation time may be characterized by measuring the sharpness of the second peak 40, e.g. measuring the time between when the second peak 40 reaches 50% of the maximum for the first time while increasing and when the second peak 40 reaches 50% of the maximum for the second time while decreasing. The release time, i.e. the time it takes the change from the actuate state to the release state, is also a function of the pressure and can also be used to measure the ambient pressure to which the device is exposed.

Figure 2:
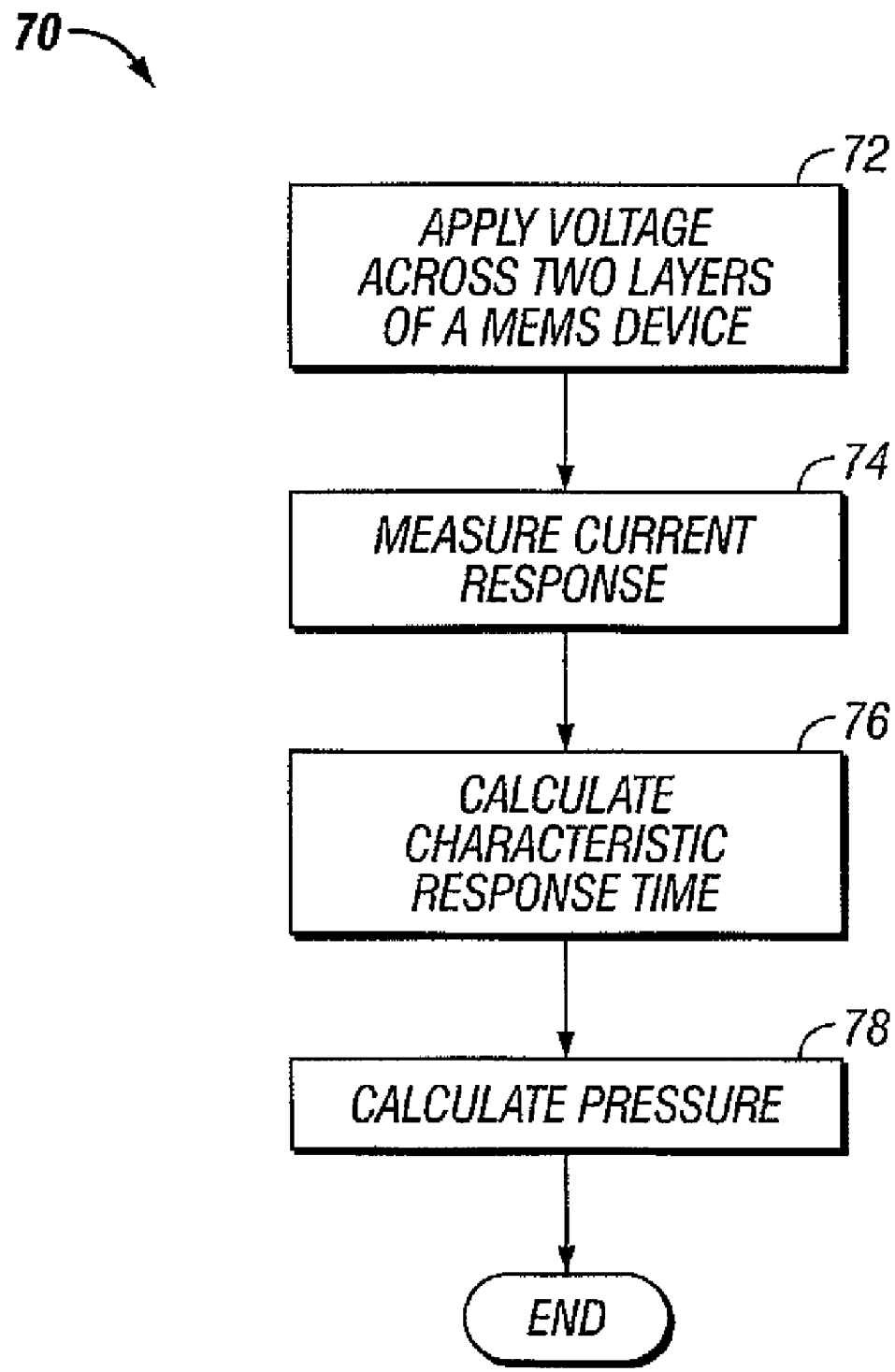
FIG. 2 is a flowchart which shows a method of measuring pressure according to one embodiment of the invention.

FIG. 2 is a flowchart which shows a method 50 of measuring pressure according to one embodiment of the invention. In a first stage, a voltage is applied across two layers of a MEMS device 72. In the next stage, the current response resulting from this applied voltage is measured 74. In the next stage, a value characteristic of the response time of the device is obtained based on the measured current response 76. In the final stage, the pressure about the device is obtained based on the value characteristic of the response time 78.

Figure 3:
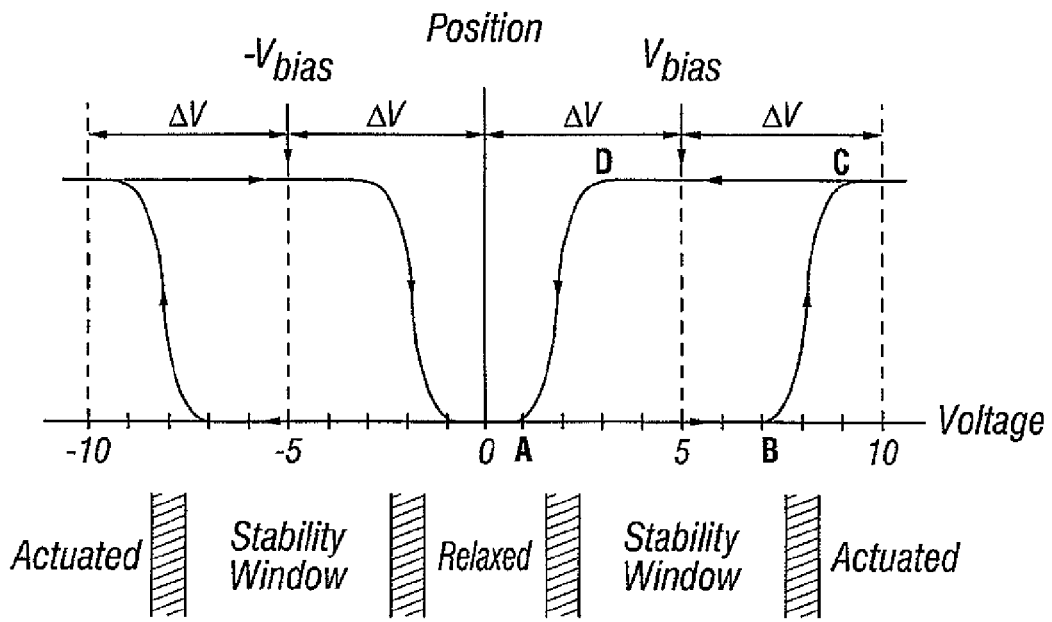
FIG. 3 is a diagram of movable mirror position versus applied voltage for one exemplary embodiment of a MEMS device.

The bistable nature of such a MEMS device is enabled by a linear mechanical force competing with a nonlinear electrostatic force. This creates hysteresis in the device. In one embodiment of the invention, as shown in FIG. 3, when no voltage is applied across the first layer 24 and the second layer 26, the position of the first layer 24 is apart from the second layer, and the device is in the relaxed state, indicated as point A. As the voltage across the two layers is increased, the MEMS device remains in the relaxed state until a threshold is reached, indicated as point B. After the voltage across the two layers exceeds this threshold, the first layer 24 changes position to be closer to the second layer 26 and the MEMS device is in the actuated state, indicated by point C. As the voltage is decreased, the MEMS device stays in the actuated state even as the voltage is decreased below the voltage which first caused the actuation of the element, indicated by point D. After the voltage has been decreased below a second threshold, the MEMS device enters the relaxed state, indicated again by point A. The hysteresis effect occurs regardless of the polarity of the voltage, i.e. the same is true if a negative voltage rather than a positive voltage is used.

As just described, one embodiment of invention exhibits hysteresis. Thus, the applied voltage to actuate or release the device can take many forms. As shown in FIG. 1C, the applied voltage may be a step function from a release voltage to an actuation voltage. However, a change from a hold voltage (e.g. 5 volts) to an actuation voltage (e.g. 10 volts) can also cause actuation in a device in the release state. Similarly, although a step function is shown in FIG. 1C, a periodic function, such as a square wave, may be advantageous to repeatedly measure the pressure about the device as it repeatedly changes states.

The use of a bilayer MEMS device or an array of such MEMS devices, as a pressure sensor, has many advantages over typical pressure sensors. In some embodiments, the construction of such a MEMS device lends itself to the creation of an array of such devices. The use of an array adds redundancy to the measurement. If an element or even a fraction of the elements fail to operate, the device as a whole can still be used to measure pressure.

As a pressure sensor, the device may be used to measure ambient pressure as a barometer. The device may be used as an altimeter. The device may be used to measure blood pressure as part of a sphygmomanometer. With appropriate design, the device may be used to record pressure applied by a user. In one embodiment of the invention, the device is further configured as an interferometric modulator has particularly configurable optical properties, as described below. As such, it may be possible to use the device as part of a touch-screen display. Also, although the device is described to measure air pressure, it is noted that other forms of pressure may also be measured such a configured MEMS device.

Figure 4:
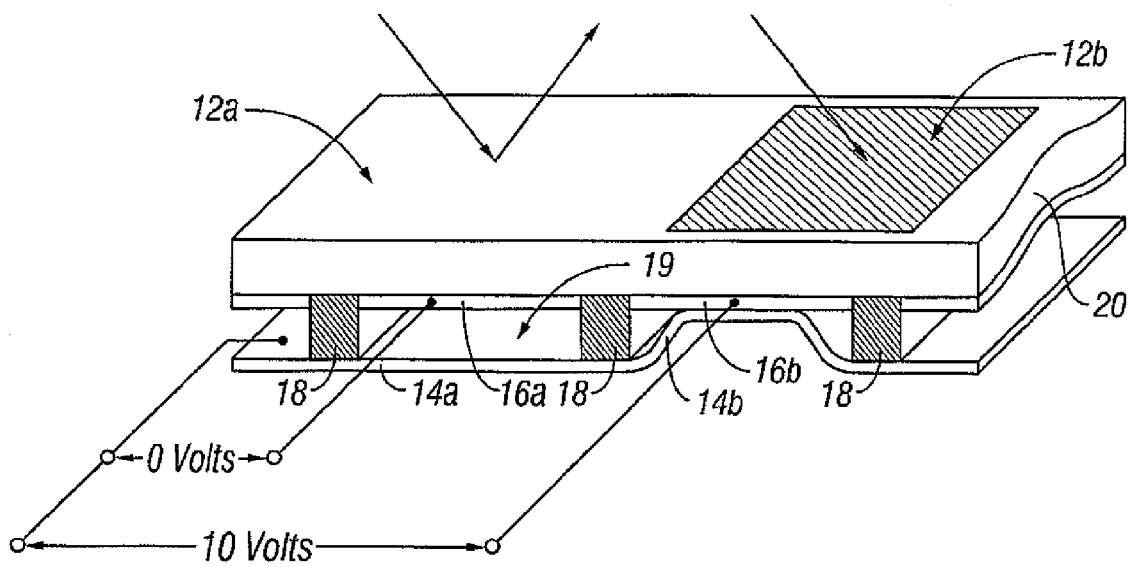
FIG. 4 is an isometric view depicting a portion of one embodiment of the invention as an interferometric modulator display in which the first layer, a movable reflective layer, of a first interferometric modulator is in a relaxed position and the first layer of a second interferometric modulator is in an actuated position.

FIG. 4 is an isometric view depicting a portion of one embodiment of an interferometric modulator array in which a movable reflective layer of a first interferometric modulator is in a relaxed position and a movable reflective layer of a second interferometric modulator is in an actuated position. As described, a MEMS device designed to measure pressure can be further configured with specific optical properties. Similarly, standard interference modulators can be used as a general MEMS device to measure ambient pressure. The depicted portion of the modulator array in FIG. 4 includes two adjacent interferometric modulators 12a and 12b. In the interferometric modulator 12a on the left, the first layer, a movable reflective layer 14a, is illustrated in a relaxed position at a predetermined distance from the second layer, an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16) typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 4. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this FIG.) within the optical stack 16 may prevent shorting and control the separation distance between layers 14 and 16, as illustrated by interferometric light modulator 12b on the right in FIG. 4. The behavior is the same regardless of the polarity of the applied potential difference. In this way, row/column actuation that can control the reflective vs. non-reflective pixel states is analogous in many ways to that used in conventional LCD and other display technologies.

Some embodiments of the invention may include a display element with which to output the measured ambient pressure. The display element may be an LCD display, such as those used in wristwatches, or the display element may be an interferometric array. In the case an interferometric array is used to display the ambient pressure, it may be possible to configure the array to both measure and display the ambient pressure about the device.

Figure 5:
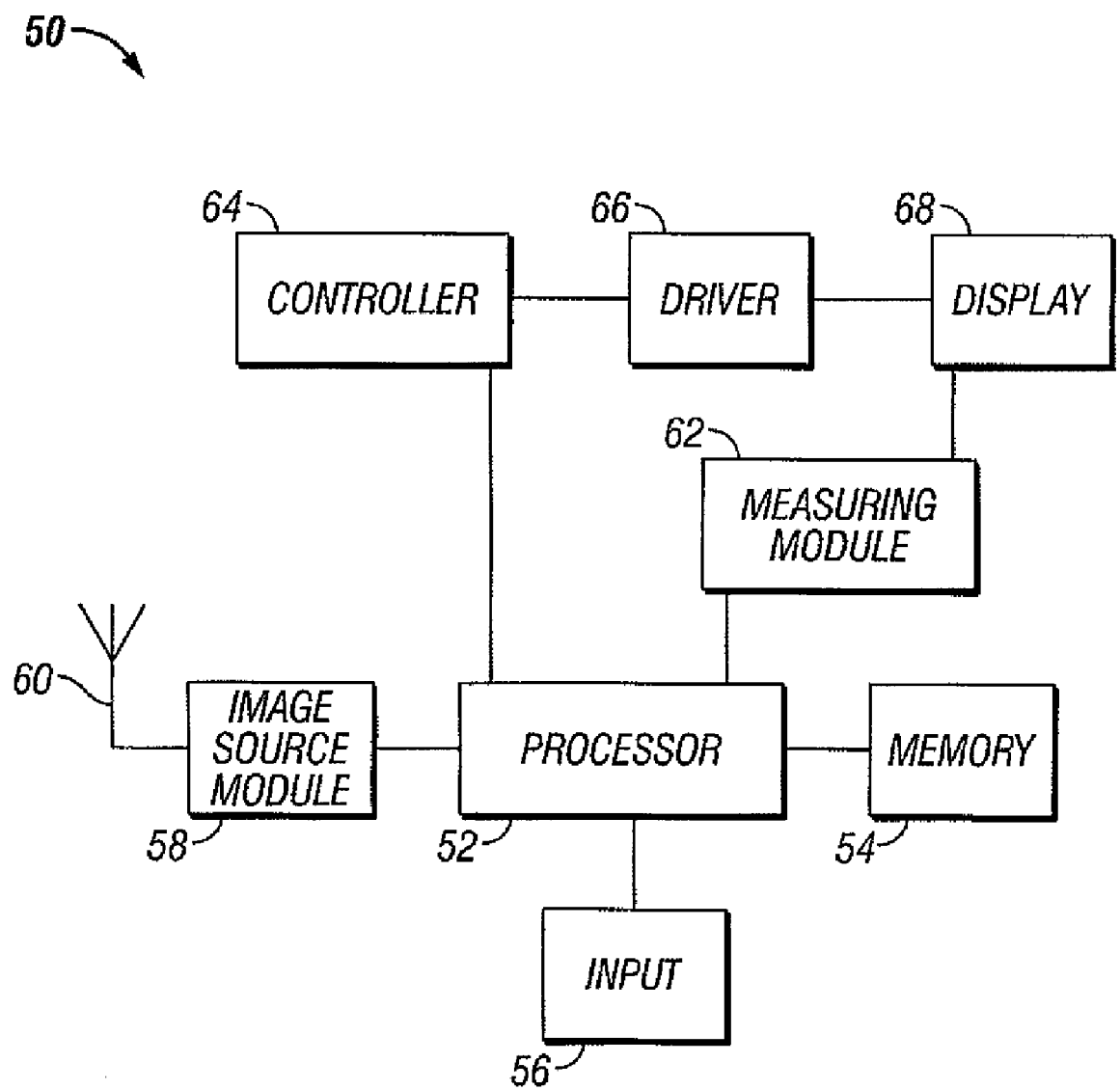
FIG. 5 is an exemplary embodiment of the invention.

FIG. 5 is an exemplary embodiment of the invention. In this embodiment, the device 50 comprises a processor 52, a memory 54, an input 56, an image source module 58, a transceiver 60, a measuring module 62, a controller 64, a driver 66, and a display 68. In an exemplary operation, a user wishing to measure the pressure about the device indicates this desire using the input 56. The processor 52 passes this instruction the controller 64, which activates a driver 66 which drives the display 68. A measuring module 62 connected to display 68 measures the current response of at least one of the MEMS device embodied in the display 68 and passes this information to the processor 52. The processor may access memory 54 storing code to calculate the pressure about the device from the measured current response. The device may be embodied in a general display unit which receives images from an image source module 58. Further, the image source module 58 is connected to a transceiver 60, which may act as a transmitter and a receiver, in order to receiver new images.

The foregoing description sets forth various preferred embodiments and other exemplary but non-limiting embodiments of the inventions disclosed herein. The description gives some details regarding combinations and modes of the disclosed inventions. Other variations, combinations, modifications, modes, and/or applications of the disclosed features and aspects of the embodiments are also within the scope of this disclosure, including those that become apparent to those of skill in the art upon reading this specification. Thus, the scope of the inventions claimed herein should be determined only by a fair reading of the claims that follow.

What is claimed is:

1. A device for measuring pressure comprising:
at least one element comprising two layers separated by a space, wherein a dimension of the space changes over a variable time period in response to a voltage applied across the two layers; and
a measuring module configured to measure the time period, wherein the time period is the time between when a voltage is applied and when a motion of at least one of the layers reaches a maximum velocity and is indicative of the ambient pressure about the device.

2. The device of claim 1, wherein the time period is a linear function of the ambient pressure about the device.

3. The device of claim 1, wherein the time period is measured by measuring the current induced by a motion of at least one of the layers.

4. The device of claim 1, wherein the device comprises a plurality of elements arranged to provide redundancy in the measurement of the time period.

5. The device of claim 1, wherein the device outputs the ambient pressure to a user of the device.

6. The device of claim 1, wherein the ambient pressure is indicative of an altitude, and wherein the device outputs the altitude to a user of the device.

7. The device of claim 1, wherein the measuring module is configured to repeatedly measure the time period to continuously monitor the ambient pressure about the device.

8. The device of claim 1, further comprising a control module to apply a voltage across the two layers.

9. The device of claim 8, wherein the applied voltage is a square wave.

10. The device of claim 1, further comprising:
a display;
a processor that is configured to communicate with said display, said processor being configured to process image data; and
a memory device that is configured to communicate with said processor.

11. The device of claim 10, further comprising a driver circuit configured to send at least one signal to the display.

12. The device of claim 11, further comprising a controller configured to send at least a portion of the image data to the driver circuit.

13. The device of claim 10, further comprising an image source module configured to send said image data to said processor.

14. The device of claim 13, wherein the image source module comprises at least one of a receiver, transceiver, and transmitter.

15. The device of claim 10, further comprising an input device configured to receive input data and to communicate said input data to said processor.

16. A method of measuring pressure comprising:
applying a voltage across two layers of a microelectromechanical device;
measuring a response time of the device, wherein the response time is the time between when the voltage is applied and when a motion of at least one of the layers reaches a maximum velocity; and
determining a pressure about the device based on the measured response time.

17. The method of claim 16, wherein the response time is measured by measuring an electrical current induced by a motion of at least one of the layers.

18. A device for measuring pressure comprising:
means for applying a voltage across layers of a microelectromechanical device;

means for measuring a response time of the device, wherein the response time is the time between when the voltage is applied and when a motion of at least one of the layers reaches a maximum velocity; and means for determining a pressure about the device based on the measured response time.

19. The device of claim 18, wherein the means for applying comprises at least one of a processor, a controller, and a driver.

20. The device of claim 18, wherein the means for measuring comprises at least one of a measuring module and an ammeter.

21. The device of claim 18, wherein the means for determining comprises a processor.

22. A device for measuring pressure comprising:
at least one element comprising two conductive layers separated by a space, wherein a dimension of the space changes over a variable time period in response to a change in voltage applied across the two layers;
a measuring module configured to measure current flowing between the two conductive layers as a function of time when there is a change in voltage applied between the two conductive plates; and
a processor configured to determine the time difference between when the voltage pulse is applied and when the local maximum of the motion current occurs, wherein the processor is further configured to associate the time difference with an ambient pressure.

* * * * *